United States Patent [19]

Scheffer

[11] 4,178,429

[45] Dec. 11, 1979

[54] CATALYST FOR CURING RESINS

[76] Inventor: Karl D. Scheffer, 121 Governor Dr., Scotia, N.Y. 12302

[21] Appl. No.: 961,666

[22] Filed: Nov. 17, 1978

[51] Int. Cl.$^2$ .......................... C08G 2/30; C08G 4/00
[52] U.S. Cl. ................... 525/398; 260/29.2 R; 260/29.2 N; 260/29.2 UA; 260/29.4 UA; 260/37 R; 260/37 N; 526/270; 528/242; 528/249; 528/259; 525/509
[58] Field of Search .................. 260/29.2 UA, 29.2 N, 260/29.2 R, 29.4 UA, 37 R, 37 N; 526/270, 403; 528/231, 242, 249, 259

[56] References Cited

U.S. PATENT DOCUMENTS

| | | | |
|---|---|---|---|
| 2,670,339 | 10/1952 | Edmunds | 528/242 X |
| 2,813,846 | 11/1957 | Farber et al. | 528/242 X |
| 3,043,804 | 7/1962 | Delmonte | 528/242 |
| 3,455,860 | 7/1969 | Valentine | 260/29.4 UA |
| 3,525,379 | 8/1970 | Johnson et al. | |
| 3,594,345 | 7/1971 | Brown et al. | 260/37 R |
| 3,597,386 | 8/1971 | deBrabander | 260/37 R |
| 3,639,654 | 2/1972 | Robins | 260/37 R |
| 3,644,274 | 2/1972 | Maurukas | 260/37 R X |
| 3,681,286 | 8/1972 | Brown et al. | 528/249 |
| 3,700,604 | 10/1972 | Metil | 528/231 X |
| 4,017,461 | 4/1977 | Dunlop et al. | 528/249 |

Primary Examiner—Lucille M. Phynes
Attorney, Agent, or Firm—Millard, Cox & Smith

[57] ABSTRACT

Process and catalyst for curing resins (e.g. furans) comprising concentrated aqueous solutions of perchloric acid (about 45–72%) and the cured resins obtained using said catalyst. Improved catalyst combinations for curing resins in a process employing same and the cured resin produced thereby comprising concentrated perchloric acid, a small amount of phosphoric acid and/or a small amount of boric acid.

31 Claims, No Drawings

CATALYST FOR CURING RESINS

This invention relates to an improved catalyst or catalyst systems for curing resins such as furan foundry binders or fiberglass composites at room temperature comprising a concentrated aqueous solution of perchloric acid, the curing process employing said catalyst and the cured resin produced by said catalyst. The present invention also relates to said catalysts having improved stability and/or deep set cure properties, respectively, by use in combination therewith a small amount of phosphoric acid and/or boric acid.

BACKGROUND OF THE INVENTION

Curing of resins can be achieved under various conditions. One well known method in the foundry core or mold art involves using a catalyst to bring about cure at room temperatures or the "no-bakes" as they are generally called. While having acceptable performance in commercial use, present catalysts nevertheless possess features which leave room for improvement. For example p-toluene sulfonic acid is one such catalyst which enjoys some commercial use. However, the sulfur element in such a catalyst presents environmental problems when the core is burned out and the binder oxidized to form among other compounds, $SO_2$ on pouring the metal to be cast. Beyond that, the sulfur frequently causes the metal surface to be sulfided by reaction with the iron component to form iron sulfide.

Another catalyst which has also achieved some commercial acceptance is phosphoric acid. However, like its toluene sulfonic acid counterpart, phosphoric acid catalysts frequently react with the metal surfaces of poured metals which contact cores and/or molds employing phosphoric acid used for curing the binder. The result is that the metal surface is phosphatized to iron phosphide which is not desired. Furthermore, cores employing binders cured with either toluene sulfonic acid or phosphoric acid tend to be relatively inefficient in the burn-out phase during pouring of metals and generate odors and smoke which again presents environmental problems. Both p-toluene sulfonic acid and phosphoric acid are also far less efficient in that much greater quantities of these catalysts are required for acceptable cure.

SUMMARY OF THE INVENTION

It has been found that acid curable resins can be consistently and otherwise advantageously cured using a concentrated solution of perchloric acid. In modified and preferred embodiments the resin is cured by admixing it with a combination of perchloric acid in a concentration of about 45 to about 72% by weight in water and at least one member selected from the group consisting of phosphoric acid and boric acid. The resulting resin, particularly when used as a foundry binder produces a core or mold which has advantageous properties of more efficient "burn-out" and reduced smoke compared to core or mold binders cured with the prior art catalysts. It has also been found that perchloric acid, which is a strong oxidizer, is effectively stabilized even in the presence of organic binder by adding a small but effective amount of phosphoric acid. Still further it has been found that the "deep-set" characteristics of the perchloric acid catalyst in foundry cores or molds, with or without the phosphoric acid stabilizer, are enhanced by employing a small but effective amount of boric acid in combination with the perchloric acid in the curing stage.

DETAILED DESCRIPTION

With the exception of the catalyst system of the present invention the remainder of the features of the relevant art are known and are generally the same as in prior art practices. These will be discussed to some degree for completeness and convenience of the reader although they are well known to those skilled in the art.

The resins to be cured by my catalyst system are generally those which are acid catalyzed. Examples are furans, phenol-formaldehyde, and oil-oxygen resins (that is the well known pretreated linseed oil based resins). Preferred resins to be cured according to the invention are the well known furans used in making foundry core binders. The furans may be the alkaline catalyzed type since the use of additional catalysts will neutralize the resin and cure same. The furans more usually involve the reaction of furfuryl alcohol with urea and formaldehyde or urea-formaldehyde resin. The foregoing are sometimes modified by phenolic resins or other modifiers. The phenol-formaldehyde resins are also well known in the art. Typically these would be those prepared by reacting phenol and formaldehyde with an acid or base as catalyst. The amount of modifiers which can be employed varies widely as is well known in the art depending on the particular effect and degree thereof to be achieved. For example, the phenolic is used in amounts ranging from as little as about 2% to as much as about 40%. The urea can be omitted but properties are affected such as some loss of shake-out. The resin should be readily pourable and therefore thin having a viscosity of less than about 0.2 to about 1.5 Stokes. Generally viscosities on the order of about 0.2 to 0.5 Stokes are preferred.

The perchloric acid catalyst systems of the invention utilize aqueous solutions of perchloric acid having a concentration in the range of about 45% to about 72% by weight. The concentration of perchloric acid which is commercially available in most cases is about 70 to 72%. Accordingly, in such cases using lower concentrations will require dilution with water. Preferred concentrations of aqueous solutions of perchloric acid are 50 to 60% by weight. The concentrated solutions provide good cure times without introduction of excessive water and also provide binders of good properties and tensile strength and hardness in particular.

Perchloric acid can react with organic materials and cause them to ignite. Accordingly, in this invention the perchloric acid is stabilized by adding of a small amount of phosphoric acid, for example, 4% (by addition of about 5% by weight of 75% concentrated phosphoric acid) thereby avoiding any problem of ignition. Suitable amounts of phosphoric acid include 1 to 10% by weight based on the perchloric acid catalyst solution. Preferred amounts of phosphoric acid include 2 to 3.5% by weight based on the perchloric acid. Concentrations of phosphoric acid other than 75% can be used when separately added or in forming a solution with perchloric acid. The amount of phosphoric acid required is greater at increased dilutions or reduced concentrations. However, the concentrated phosphoric acid at about 70% and above is preferred to avoid introduction of unnecessary amounts of water.

As to the boric acid which aids in the deep-set of the resin in forming a core or mold, only a very small amount is required. The broad range which will normally be found suitable is 3 to 7% by weight based on the catalyst composition of boric acid. The preferred amount of boric acid employed is in the range of ½ to 1% or parts by weight of the sand. Boric acid is not very soluble in water and accordingly it may be found more convenient to use it as a powder premixed with the sand. When employed as a solution separately added to the sand or in premixing with the perchloric acid, the more concentrated boric acid is preferred again to avoid the introduction of unnecessary water into the system.

The phosphoric acid and boric acid components have been discussed in some cases in terms of certain concentrations. However, it is to be understood that such are merely convenient methods of adding such acids directly to the sand or sand and resin mixture. Such may also facilitate addition of the acid to the catalyst solution so as to avoid unnecessary generation of heat, possible degradation of catalyst or similar disadvantages. The foregoing being understood it will be appreciated that it suffices to discuss the relative amounts of acid components in terms of the acid per se or active component without water of dilution as has been done herein. The various dilutions possible with the several acids and the water present are sufficiently well understood by skilled artisans. Therefore, further discussion is not necessary in light of that already found herein.

Either the boric or phosphoric acid may be added to the sand or sand-resin mix independently of the perchloric acid. However, the phosphoric acid and boric acid both can be, and the phosphoric at least is, preferably premixed with the perchloric acid. The premixing of the phosphoric acid and perchloric acid should be carried out at an early point so that virtually all handling occurs after the perchloric acid is in a stabilized condition. The acid catalyst or catalyst system preferably is added separately to the sand to prewet it before addition of the resin and the mixing thereof. The term "catalyst system" refers to a mixture of perchloric acid and phosphoric acid and/or boric acid.

Either new or reclaimed sand or mixtures thereof can be used. The sands that are suitable are all types of silica sands, lake and bank sands. The silica sands are preferably of the low acid demand type (e.g. on the order of 2 or 3 acid demand) although higher and lower acid demand silica sands also perform satisfactorily by adjustment of the amount or level of catalyst used. The higher the acid demand of the sand, the greater the level of catalyst required. Other refractory particulates can be used. Examples of these are St. Petersburgh deposits in Illinois lake and bank sands in Michigan, Pennsylvania glass sand, chromite sand, aluminum silicate and zircon sands.

The resin binder is most often used in a weight range based on weight of the sand of 0.5 to 5%. More usually and preferably 1 to 2.5% of binder based on the weight of sand is employed.

The temperature of the cure and accordingly of ingredients used in the process is ambient and preferably normal room temperature. Variations in temperature, however, can in most cases be compensated for by varying the amount of catalyst. If the temperature increases during the summer months less catalyst is used and, in turn, as the temperature decreases in the fall and winter larger amounts of catalyst are used. Other compensations can be made by blending new and reclaimed sand to either elevate or reduce the temperature. The foregoing examples are merely illustrative as those skilled in the art will be aware of other means of dealing with temperature considerations.

The amount of perchloric acid aqueous solution or the amount of perchloric acid, phosphoric acid, and boric acid combination used is based on the weight of resin to be cured. The level (the amount of solution) will vary, of course, with the perchloric acid concentration with greater amounts required with more dilute solutions. For example, using a perchloric acid solution of 70% concentration at a 3% level with a furan resin (described hereinbelow) does not achieve an acceptable cure rate as the strip time is about 7½ hours. At a 9% level the work time is only 2 minutes which is too short. At a 6% level the work time is 12 minutes and the strip time is 24 minutes which are commercially acceptable work and strip times. As used in this paragraph the term "level" denotes the weight of perchloric acid solution added per 100 parts of resin. At a perchloric acid concentration of 50% the levels can, and in fact are, required to be higher. This has some advantages in that the larger amounts are easier to accurately measure or proportion, particularly with automatic metering devices. Furthermore, the larger amounts make the mixing to wet the sand easier and certainty of wetting all the sand with the catalyst at short mixing times much greater. Usually the catalyst at the concentrations discussed herein will produce acceptable results at levels in the range of about 4 to 11% based on weight of resin. Generally preferred levels of such a catalyst are in the range of about 6% to about 9½%.

The binders of this invention are not limited to casting ferrous metals such as iron and steel but can be used with many non-ferrous metals including aluminum, brass and bronze.

Having described the invention in varying scopes, detailed illustrative examples will now be set forth. All parts or percentages are by weight unless stated otherwise.

EXAMPLES

Two different commercially available furan resin binders were selected for evaluation. They were prepared by reacting furfuryl alcohol with formaldehyde in one case and also with urea in another (i.e. where nitrogen is shown as present). These resins are identified as Resin 1 and 2, respectively, in TABLE I below, which defines their properties.

TABLE I

| Resin | Viscosity in Stokes | % Water | % Nitrogen | pH | Color |
|---|---|---|---|---|---|
| No. 1 | 0.25 | 1.50 | 1.20 | 6.9 | Dark Reddish Brown |
| No. 2 | 0.75 | 0.70 | 0.00 | 8.10 | Brown-Red Clear Liquid |

Core samples were prepared with conventional equipment and using standard procedures as follows: Wedron 5010 sand (a washed and dried, round grain sand with a grain fineness of about 60 and an acid demand of about 2 to 3) was mixed with catalyst in a paddle or blade type mixer (i.e. a small Hobart mixer) and then resin was added and mixing continued. The resin coated sand was placed and tamped into a sample corebox.

The core samples were allowed to cure in their core boxes and were stripped when a reading of 25 p.s.i. was obtained on a mold strength tester. At intervals the tensile strength and scratch hardness were tested.

The conditions and the observations are recorded in TABLE II and TABLE III respectively.

TABLE II

| Experiment No. | Resin | Temperature Ambient | Temperature Sand | Humidity (% Relative) | Catalyst | Catalyst level* | Amount of Resin to Sand | Catalyst Sand Mix Time | Additional Mix Time With Resin |
|---|---|---|---|---|---|---|---|---|---|
| 1 | No.1 | 70° F. | 75° F. | 72 | 70% Perchloric Acid, 30% Water | 3% | 1.5% | 2 minutes | 2 minutes |
| 2 | " | " | 75° F. | " | 70% Perchloric Acid, 30% Water | 6% | " | " | " |
| 3 | " | " | " | " | 70% Perchloric Acid, 30% Water | 9% | " | " | " |
| 4 | No.2 | 68° F. | | 71 | 70% Perchloric Acid, 30% Water | 12.5% | " | " | " |

*Parts by weight of perchloric acid and water per 100 parts of resin.

TABLE III

| Experiment No. | Work Time | Strip Time | Tensile Strength 1 hr. | Tensile Strength 3 hrs. | Tensile Strength 24 hrs. | Scratch Hardness 1 hr. | Scratch Hardness 3 hrs. | Scratch Hardness 24 hrs. |
|---|---|---|---|---|---|---|---|---|
| 1 | — | 7.5 hrs. | — | — | 250 | — | — | 78 |
| 2 | 12 min. | 24 min. | 114 | 231 | 226 | 66 | 71 | 71 |
| 3 | 2 min. | 7 min. | 41 | 48 | 42 | 28 | 36 | 34 |
| 4 | Set up while mixing | — | — | — | — | — | — | — |

While the invention has been described in connection with the production of foundry cores and molds, it can be applied to the production of shaped articles of any kind. As previously alluded to, one different application is in preparing fiberglass reinforced panels.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention.

I claim:

1. A resin curing catalyst comprising an aqueous solution of perchloric acid in a concentration of about 45 to about 72% based on weight.

2. A catalyst according to claim 1 which includes a combination of at least one member selected from the group consisting of phosphoric acid and boric acid.

3. A catalyst combination according to claim 2 wherein the member selected from said group is phosphoric acid and said perchloric acid and said phosphoric acids are present together in an aqueous solution.

4. A catalyst combination according to claim 3 which includes both phosphoric acid and boric acid.

5. A catalyst combination according to claim 3 wherein said phosphoric acid is present in an amount in the range of about 1 to about 10% by weight.

6. A catalyst combination according to claim 2 wherein the said perchloric acid is in a concentration of from about 50% to 60% by weight.

7. A catalyst combination according to claim 6 wherein phosphoric acid and boric acid are also present, wherein said phosphoric acid is present in an amount in the range of about 2 to about 3.5% by weight of catalyst solution and said boric acid is present in an amount in the range of about ½ to about 1% by weight of the sand.

8. A process of curing an acid catalyzed curing resin which comprises admixing said resin with an aqueous solution of perchloric acid containing about 45 to about 72% by weight of acid.

9. A process according to claim 8 wherein said resin is also admixed with sand and at least one member selected from the group consisting of phosphoric acid and boric acid.

10. A process according to claim 9 wherein the member selected from said group is phosphoric acid and said perchloric acid and said phosphoric acid are mixed together as a preformed solution containing both acids.

11. A process according to claim 10 wherein said resin is admixed with both of said phosphoric and boric acids.

12. A process according to claim 10 wherein said phosphoric acid is employed in an amount in the range of about 1 to about 10% by weight of said catalyst solution.

13. A process according to claim 9 wherein said perchloric acid is in a concentration of from about 50% to about 60% by weight.

14. A process according to claim 11 wherein said phosphoric acid is present in an amount in the range of about 2 to about 3.5% by weight of the catalyst and said boric acid is present in an amount in the range of about ½ to about 1% by weight of the sand.

15. A process according to claim 8 wherein sand is added and said resin is a furan and said aqueous solution is employed at a level in the range of about 4 to about 10% by weight based on resin.

16. A process according to claim 9 wherein said resin is a furan and said aqueous solution is employed at a level in the range of about 6 to about 9½% by weight based on resin.

17. A process according to claim 11 wherein said resin is a furan and said aqueous solution is employed at a level in the range of about 4 to about 11% by weight based on resin.

18. A process according to claim 14 wherein said resin is a furan and said aqueous solution is employed at a level in the range of about 4 to about 11% by weight based on resin.

19. A process according to claim 14 wherein said resin is a furan and said aqueous solution is employed at a level in the range of about 6 to about 9½% by weight based on resin.

20. A process according to claim 8 wherein said resin is a furan.

21. A process according to claim 9 wherein said resin is a furan.

22. A cured resin composition comprising an acid catalyzed curing resinous compound having relatively uniformly distributed throughout same concentrated perchloric acid.

23. A composition according to claim 22 wherein perchloric acid is present at a level in the range of about 2 to 5% based on a precursor aqueous solution in a concentration of about 45 to about 72%.

24. A composition according to claim 22 wherein said resinous compound has additionally present and distributed relatively uniformly throughout same sand and at least one member selected from the group consisting of phosphoric acid and boric acid.

25. A composition according to claim 24 wherein small amounts of both phosphoric acid and boric acid are present and distributed relatively uniformly throughout said resin.

26. A composition according to claim 25 wherein said resin is a cured furan.

27. A composition according to claim 24 wherein said member of said group is phosphoric acid.

28. A composition according to claim 24 wherein both phosphoric acid and boric acid are present.

29. A composition according to claim 27 wherein said phosphoric acid is present in an amount in the range of about 1 to about 10%.

30. A composition according to claim 28 wherein said phosphoric acid is present in an amount in the range of about 2 to about 3.5% based on perchloric acid catalyst precursor composition and said boric acid is present in the range of about 1.5% to about 3.5% based on perchloric acid catalyst precursor composition.

31. A composition according to claim 28 wherein said phosphoric acid is present in an amount in the range of about 2% to about 3.5% based on perchloric acid catalyst precursor composition and said boric acid is present in the range of about ½% to about 1% based on the sand.

* * * * *